United States Patent
Youngers et al.

(10) Patent No.: US 10,099,529 B2
(45) Date of Patent: Oct. 16, 2018

(54) AUTOMATICALLY DEPLOYING LIFT AXLE CONTROL SYSTEM

(71) Applicant: Polar Tank Trailer, LLC, Holdingford, MN (US)

(72) Inventors: Matthew N. Youngers, Holdingford, MN (US); Brian M. Preusser, Eden Prairie, MN (US)

(73) Assignee: Polar Tank Trailer, LLC, Holdingford, MN (US)

( * ) Notice: Subject to any disclaimer, the term of this patent is extended or adjusted under 35 U.S.C. 154(b) by 49 days.

(21) Appl. No.: 15/190,590

(22) Filed: Jun. 23, 2016

(65) Prior Publication Data

US 2017/0021687 A1 Jan. 26, 2017

Related U.S. Application Data

(60) Provisional application No. 62/183,427, filed on Jun. 23, 2015.

(51) Int. Cl.
| | |
|---|---|
| *B60G 17/015* | (2006.01) |
| *B60G 17/017* | (2006.01) |
| *B60G 17/0185* | (2006.01) |
| *B60G 17/052* | (2006.01) |
| *B62D 61/12* | (2006.01) |

(52) U.S. Cl.
CPC ....... *B60G 17/0155* (2013.01); *B60G 17/017* (2013.01); *B60G 17/0185* (2013.01); *B60G 17/0525* (2013.01); *B62D 61/12* (2013.01); *B60G 2202/242* (2013.01); *B60G 2204/47* (2013.01); *B60G 2300/02* (2013.01); *B60G 2300/04* (2013.01)

(58) Field of Classification Search
CPC .............. B60G 17/0155; B60G 17/017; B60G 17/0185; B60G 17/0525; B60G 2202/242; B60G 2204/47; B60G 2300/02; B60G 2300/04; B62D 61/12
See application file for complete search history.

(56) References Cited

U.S. PATENT DOCUMENTS

| 5,048,867 A | | 9/1991 | Gradert | |
|---|---|---|---|---|
| 5,100,167 A | * | 3/1992 | Kamimura | ........... B60G 17/017 280/124.158 |
| 2006/0170168 A1 | | 8/2006 | Rotz et al. | |

FOREIGN PATENT DOCUMENTS

| CA | 2818422 | | 12/2014 | | |
|---|---|---|---|---|---|
| EP | 0830958 | | 10/1999 | | |
| EP | 2311671 | | 4/2011 | | |
| JP | 03042321 | A * | 2/1991 | ........... | B60G 17/056 |

OTHER PUBLICATIONS

International Search Report and Written Opinion issued in related PCT/US2016/38974, dated Sep. 15, 2016.

* cited by examiner

*Primary Examiner* — Faye M Fleming
(74) *Attorney, Agent, or Firm* — Barnes & Thornburg LLP; Jeffrey R. Stone

(57) ABSTRACT

The present invention provides various devices and systems comprising a controller in connection with a first deployment mechanism to raise and lower a first lift axle on a wheeled vehicle, and in some cases a second deployment mechanism in connection with the controller for raising and lowering a second lift axle. A fail-safe mechanism is provided that automatically lowers the lift axle(s) if the controller is not receiving any electrical power.

11 Claims, 2 Drawing Sheets

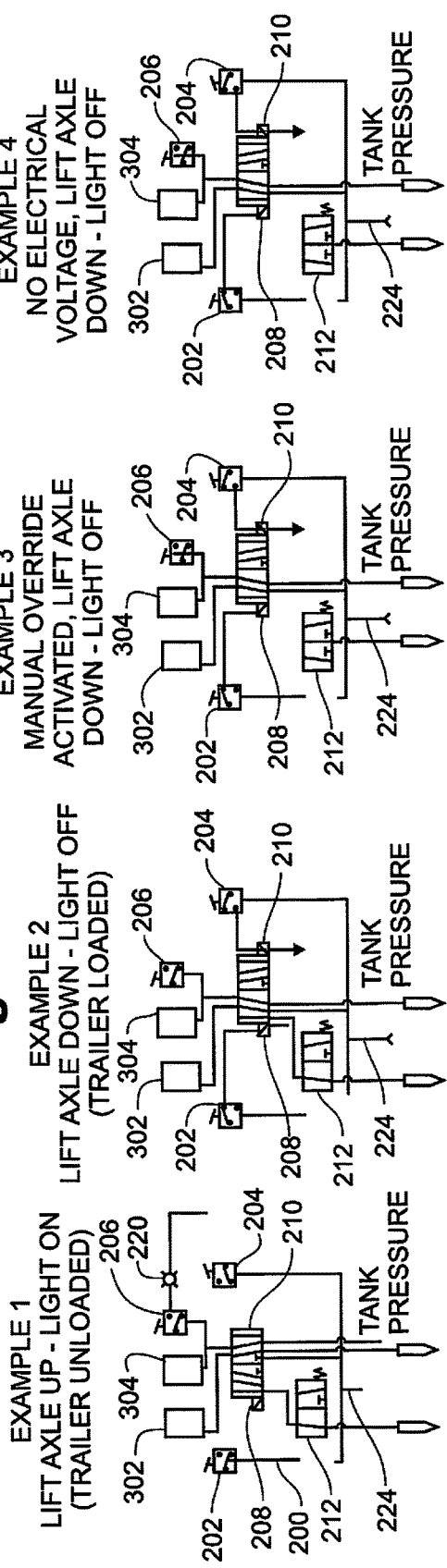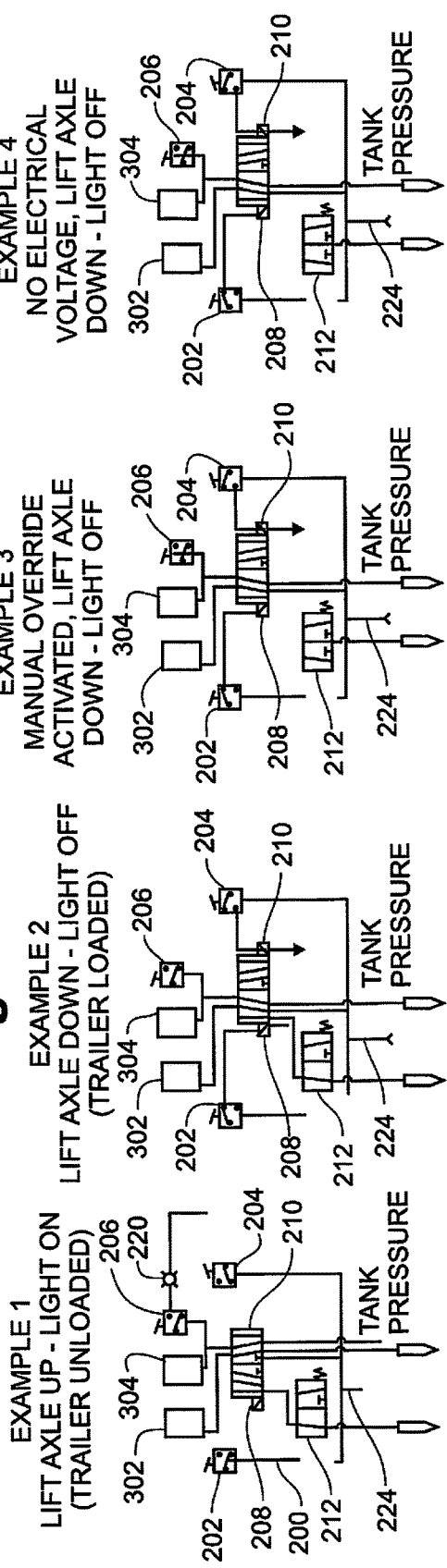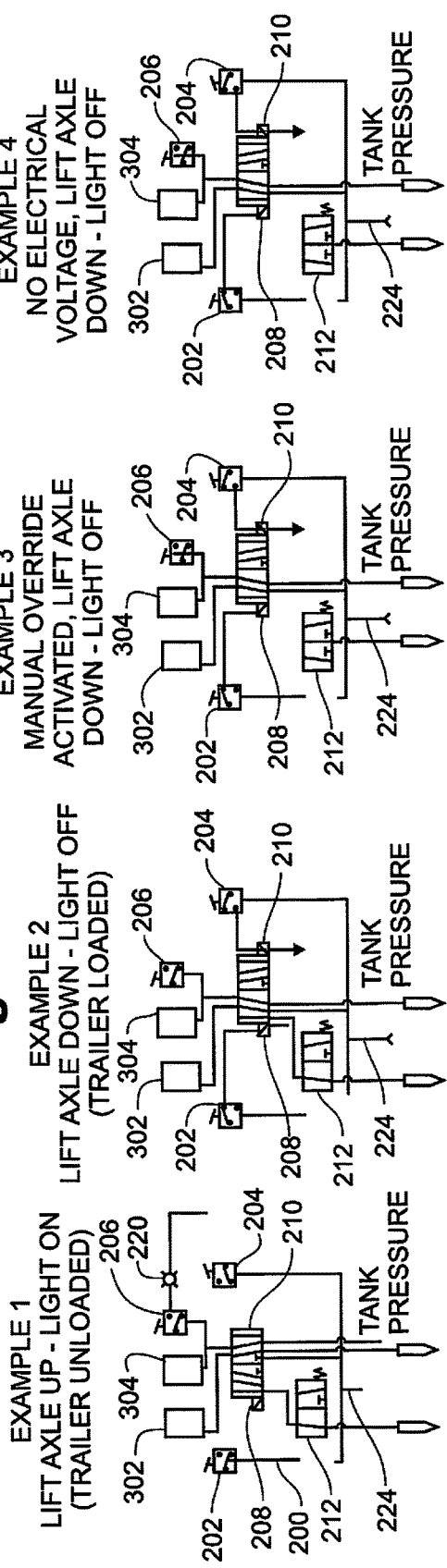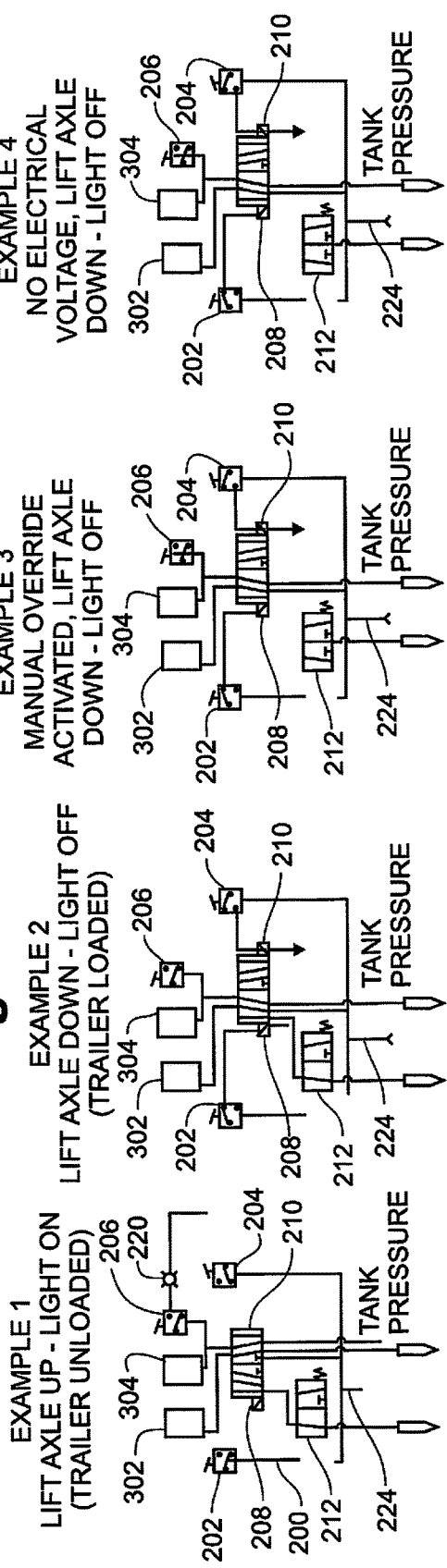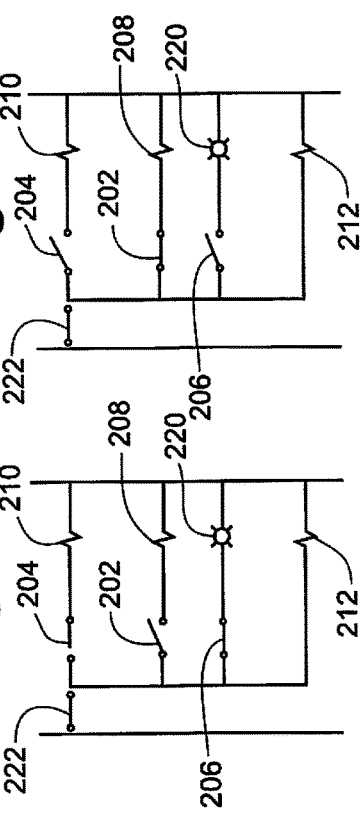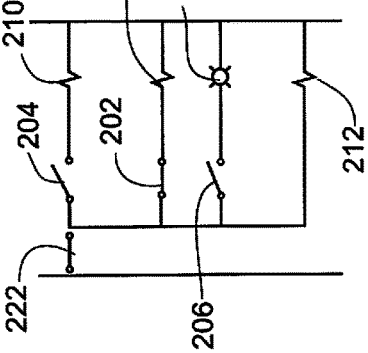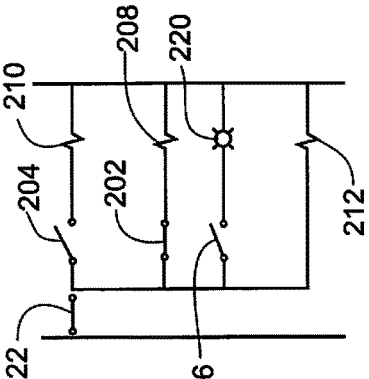

AUTOMATICALLY DEPLOYING LIFT AXLE CONTROL SYSTEM

CROSS-REFERENCE TO RELATED APPLICATIONS

This application claims the benefit of U.S. Provisional Application No. 62/183,427, filed Jun. 23, 2015 and entitled AUTOMATICALLY DEPLOYING LIFT AXLE CONTROL SYSTEM, the entirety of which is hereby incorporated by reference.

STATEMENT REGARDING FEDERALLY SPONSORED RESEARCH OR DEVELOPMENT

Not Applicable

BACKGROUND OF THE INVENTION

Field of the Invention

The disclosure generally relates to control systems for a lift axle, or lift axles, in a two-or-more suspension for wheeled vehicles, including trucks and trailers.

Description of Related Art

Multi-axle suspensions, commonly found on trucks and trailers and related vehicles, generally have suspension systems that allow for selective raising and lowering of one axle relative to the other axles. The axle that is raised and lowered is known in the art as a lift axle.

When the lift axle is lowered, its wheels engage the road surface or other terrain, thereby enabling the lift axle's wheels to bear some of the vehicle weight and, in turn, relieving the other axles' wheels from some of the vehicle weight they would otherwise bear. When the lift axle is raised, its wheels disengage the underlying surface and, when disengaged, the raised wheels no longer assist in bearing the vehicle's weight.

Among the factors in the decision to raise or lower a lift axle is the total vehicle load. This information may be obtained from a number of sources as is known in the art. Generally, if the vehicle load is of a weight that is greater than a predetermined threshold weight, a decision may be made, either manually or automatically, to lower the lift axle to assist in weight bearing. If the vehicle load weight is below a predetermined threshold weight, the decision may be made, either manually or automatically, to raise the lift axle to assist in, inter alia, fuel consumption and tire wear on the lift axle tires.

BRIEF SUMMARY OF THE INVENTION

The present invention provides various devices and systems comprising a controller in connection with a first deployment mechanism to raise and lower a first lift axle and, in some embodiments, a second deployment mechanism may be provided in connection with the controller for raising and lower a second lift axle. A fail-safe mechanism is provided that automatically lowers the lift axle(s) if the controller is not receiving any electrical power.

The present invention is capable of:

1. Automatically raising and lowering a single lift axle without any driver input or connection to switches in the cab of the vehicle;
2. Automatically raising and lowering two lift axles;
3. Automatically raising and lowering two lift axles without any driver input or connection to switches in the cab of the vehicle;
4. Providing annunciation of a lift axle(s) "up" and lift axle(s) "down" annunciation in the vehicle cab, wherein "up" annunciation is achieved by turning a dedicated light on and "down" annunciation is achieved by turning the light off; and/or
5. Automatically lowering the lift axle(s) when power to the controller is removed.

The figures and the detailed description which follow more particularly exemplify these and other embodiments of the invention.

BRIEF DESCRIPTION OF THE SEVERAL VIEWS OF THE DRAWINGS

FIG. 3A is a schematic view of one embodiment of the present invention;

FIG. 3B is a schematic view of one embodiment of the present invention;

FIG. 4A is a schematic view of one embodiment of the present invention;

FIG. 4B is a schematic view of one embodiment of the present invention;

FIG. 5A is a schematic view of one embodiment of the present invention;

FIG. 5B is a schematic view of one embodiment of the present invention;

FIG. 6A is a schematic view of one embodiment of the present invention; and

FIG. 6B is a schematic view of one embodiment of the present invention.

DETAILED DESCRIPTION OF THE INVENTION

Figure 1:
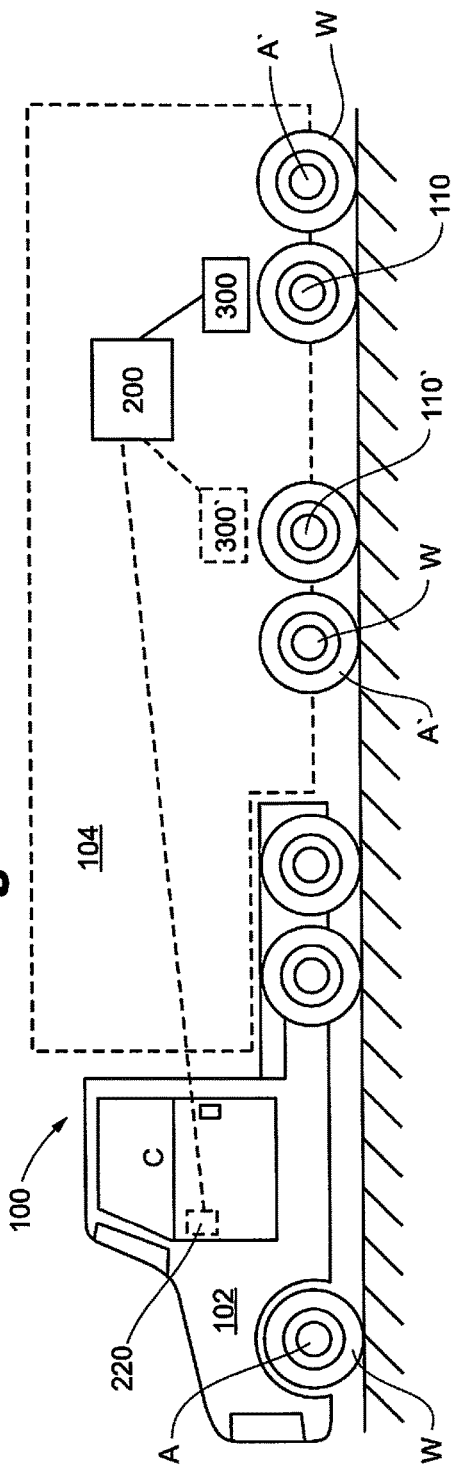
FIG. 1 is a side cutaway view of one embodiment of the present invention.

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

FIG. 1 illustrates an exemplary wheeled vehicle 100, a trailer tractor, with the tractor 102 and trailer 104 attached thereto. As shown, the tractor 102 comprises three axles A, each with wheels W attached thereto as is known in the art. The skilled artisan will recognize that additional axles and wheels may be added to the illustrative tractor 102. Trailer 104 is shown in attached engagement with tractor 102. Trailer 104 further comprises a plurality of axles A' with wheels W attached thereto, as shown four axles A with wheels W are provided.

One, or in certain embodiments two, of the illustrated axle and wheel combinations may be lift axle(s) 110 defined herein as an axle A with wheels W attached thereto and that is capable of being raised or lowered relative to the other axle and wheel combinations and the ground surface G. A tractor and trailer wheeled vehicle is illustrated, though the skilled artisan will recognize that a multi-axle truck, e.g., cement or dump trucks, will be within the scope of the present invention as these vehicles may also comprise lift axles 100.

Known control systems for lift axles 110 are only capable of raising and lowering a single lift axle 110. In certain embodiments, the present control system is capable of raising and lowering two lift axles.

Controller 200 is operatively connected with at least one deployment mechanism 300. Each deployment mechanism is in operative connection with a lift axle. As shown in solid lines in FIG. 1, controller 200 is operatively connected with a first deployment mechanism 300 which is, in turn, operatively connected with a first lift axle 110. The dashed lines of FIG. 1 indicate that the controller 200 may be simultaneously connected with a second deployment mechanism 300' that is in operative connection with a second lift axle 110'. The locations and spacing of the first and/or second lift axle(s), 110, 110' are design choices well known to the skilled artisan and, as is now obvious, may differ from the exemplary wheeled vehicle 100 of FIG. 1.

Figure 2:
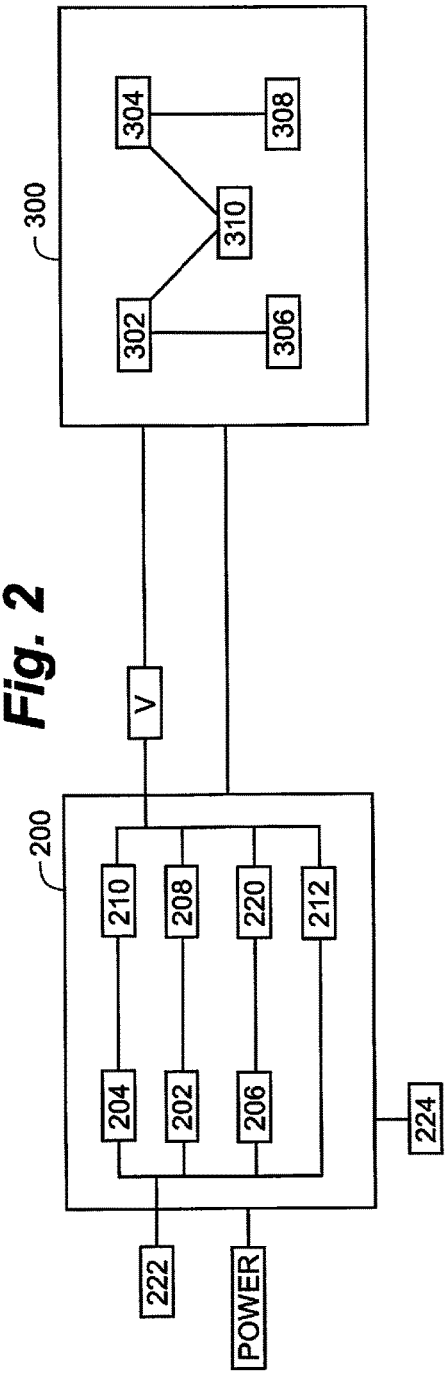
FIG. 2 is a schematic view of one embodiment of the present invention.

Turning now to FIG. 2, controller 200 may be connected with a power source and may further comprise a first pressure switch 202 a second pressure switch 204, a third pressure switch 206, a first solenoid valve 208, a second solenoid valve 210, a fail-safe solenoid valve 212, the third pressure switch 206 in operational connection with annunciator 220 remotely located as shown in FIG. 1 in the tractor cab C. The second switch 204 is in operative communication with a manual override mechanism 222 that enables an operator to manually lower the lift axle(s) 110, 110' no matter the vehicle load weight condition. Controller 200 is also in operative connection with a load pressure monitor 224 to help determine if the trailer 104 is loaded or unloaded.

Controller 200 is in operative communication with at least one deployment mechanism 300, 300' which serves the function of enabling the raising and lowering of the lift axle 100, 100' operatively connected with the deployment mechanism 300, 300'. Thus, as well known in the art, a ride bag 302 and a lift bag 304 are provided. The skilled artisan will also recognize that air springs may also be used and are included in the scope of the present invention as equivalents of ride bag and lift bag 302, 304. Ride bag 302 in fluid communication with a ride bag valve 306 and lift bag 304 in fluid communication with a lift bag valve 308, the valves 306, 308 adapted for releasing air from the respective bag 302, 304 when actuated by the controller 200 and in further operative communication with an air source 310 for filling the ride bag 302 or lift bag 304 depending on the vehicle load weight. As will be recognized by the skilled artisan, more than one, or at least one, ride bag 302 and lift bag 304 may be in operative communication with the first and/or second lift axle(s) 110, 110'.

The first switch 202 may be a high pressure switch, activated (opened) when the vehicle load weight reaches a predetermined level, e.g., >67 PSI. This condition is schematically illustrated in FIGS. 3A and 3B, wherein the first switch is opened. The first switch 202 may be closed when no electrical voltage is present as part of a fail-safe mechanism as illustrated in FIGS. 6A and 6B.

The second switch 204 may be a low pressure switch, activated when the vehicle load weight reaches a predetermined level, e.g., <23 PSI as shown in FIGS. 4A and 4B, wherein the second switch 204 is opened.

The first switch 202 and the second switch 204 monitor whether the trailer is loaded or unloaded via the HCV check valve 224.

The third switch 206 may be a low pressure switch in operative connection with the lift bag 302, activated (closed) when the pressure in the lift bag 302 is greater than a predetermined level, e.g., 10 PSI as shown in FIGS. 3A and 3B, indicating that the lift bag 302 is inflated at a sufficient level to raise the lift axle 110 and wherein the third switch 206 is closed. The third switch 206 may be opened when no electrical voltage is present as part of a fail-safe mechanism as shown in FIGS. 6A and 6B.

The inventive system uses the first and second switches 202, 204 to monitor loading conditions of the trailer 104 via the HCV check valve 224. Depending on the level of the pressure that is sensed, the first and second switches 202, 204 electrically control either the first or second solenoid valves 208, 210, respectively. First and second solenoid valves 208, 210 provide a pneumatic output to a main valve V that deploys the lift axle(s) 110, 110', wherein main valve V is in operational connection and communication with the ride bag 302 and the lift bag 304, into the appropriate position depending upon whether the first or second solenoid valve 208, 210 is operational.

The third pressure switch 206 is used to provide an output designated to turn on, or off, an annunciator 222, e.g., a light in the cab C. The third pressure switch 206 is sensing pressure applied to the lift bags 304. If pressure is present in the lift bags above a predetermined level, e.g., 10 PSI, then the third pressure switch 206 closes and enables the provision of electrical power to the annunciator 222, indicating that the lift axle(s) 110, 110' are in the "up" position.

In addition to the first and second solenoid pressure valves 208, 210, fail-safe solenoid valve 212 is provided. Fail-safe solenoid valve 212 is wired directly into the controller's 200 main power, so if the controller 200 is receiving power, so does the fail-safe valve 212 and the valve 212 is not activated to lower the lift axle(s) 110, 110'. However, if the controller 200 is not receiving power, neither will the fail-safe valve 212 and, in this condition, the fail-safe valve 212 forces the lift axle(s) 110, 110' to lower for safety by activating a spool valve to lower the lift axle(s) 110, 110'.

Working Example 1: FIGS. 3A and 3B

In this example, the trailer 104 is unloaded and the predetermined levels for the second and third switches 204, 206 are satisfied, while the predetermined level for the first switch has not been reached or satisfied. In the example, the predetermined levels are: first switch 202 pressure must be greater than 67 PSI; the second switch 204 pressure must be less than 23 PSI; and the third switch 206 pressure must be greater than 10 PSI. Thus, the first switch 202 is opened and the second and third switches 204, 206 are both closed. The effect of this set of conditions is that the lift bag 302 of the deployment mechanism 300 is filled with air and the ride bag 302 air is allowed to escape via the ride bag valve 306, thereby enabling the raising of the lift axle 110 so that the lift axle wheels W are not engaged with a ground surface. In addition, because the third switch 206 is closed, the annunciator 220 is active to "on" in the cab C so that the operator knows the lift axle 110 is indeed raised.

Working Example 2: FIGS. 4A and 4B

In this case, the trailer 104 is loaded with a weight that is >67 PSI. As a result, the first switch 202 is closed, while the second and third switches 204, 206 are opened. Accordingly, the lift axle 110 is in the down position as the ride bag 302 is filled with air and the lift bag valve 308 has allowed the lift bag 304 air to escape from the lift bag 304, thereby enabling the lift axle 110 to achieve the down position whereby the lift axle wheels W are engaged with a ground surface and the annunciator 220 is in the "off" position in the cab C so that the operator knows the lift axle is lowered.

Working Example 3: FIGS. 5A and 5B

In this example, the operator has activated the manual override switch 222 which, as shown in FIG. 5B, opens the second switch 204, no matter the vehicle weight conditions. As a result, the manual override switch 222 and the second switch 204 are opened, while the first switch 202 is closed. As a result, the lift axle 110 is lowered into the down position by filling the ride bag 302 and enabling the lift bag's 304 air to escape through its valve 308. Because the lift bag pressure in the example is less than its predetermined exemplary level, i.e., less than 10 PSI, the third switch 206 is open and the annunciator 222 is, therefore, in the "off" position in the cab C, confirming to the operator that the lift axle 110 is lowered.

Working Example 4: FIGS. 6A and 6B

Here, the controller 200 has lost all power, with no electrical voltage received by the controller 200 or its elements. In this condition, the fail-safe solenoid valve 212 is actuated to automatically lower the lift axle 110. Thus, as shown, the first switch 202 is closed and the second switch 204 is opened, enabling the ride bag 302 to fill with air via the ride bag valve 306 and the lift bag 304 to release its air through the lift bag valve 308, enabling the lift axle 110 to lower to the down position. Further, the third switch 206 is open under these conditions so that the annunciator 222 is in the "off" position in the cab C and in confirmation of the lowered lift axle 110.

The working examples provide for a single deployment mechanism 300 comprising a ride bag 302, a lift bag 304, a ride bag valve 306, a lift bag valve 308, an air source 310 and a single (first) lift axle 110 combination. However, as discussed supra, a second deployment mechanism 300' may be operatively connected with the controller C and with a second lift axle 110'. In this embodiment, the second deployment mechanism 300' performs in the same manner as, and in unison with, the first deployment mechanism 300, resulting in the first and second lift axles lifting and lowering as a unit.

The descriptions of the embodiments and their applications as set forth herein should be construed as illustrative, and are not intended to limit the scope of the disclosure. Features of various embodiments may be combined with other embodiments and/or features thereof within the metes and bounds of the disclosure. Upon study of this disclosure, variations and modifications of the embodiments disclosed herein are possible, and practical alternatives to and equivalents of the various elements of the embodiments will be understood by and become apparent to those of ordinary skill in the art. Such variations and modifications of the embodiments disclosed herein may be made without departing from the scope and spirit of the invention. Therefore, all alternatives, variations, modifications, etc., as may become to one of ordinary skill in the art are considered as being within the metes and bounds of the instant disclosure.

What is claimed is:

1. A lift axle control system for a wheeled vehicle, the vehicle comprising a plurality of fixed axles with wheels in contact with a ground surface and a first lift axle with wheels operably moveable between a raised position and a lowered position, the control system comprising:
a first deployment mechanism comprising:
at least one lift bag in operational communication with the first lift axle;
at least one ride bag in operational communication with the first lift axle;
a lift bag valve in operational communication with the at least one lift bag;
a ride bag valve in operational communication with the at least one ride bag;
an air source in operational communication with the at least one lift bag, the lift bag valve, the at least one ride bag, and the at least one ride bag valve;
a main valve in operational communication with the first deployment mechanism;
a controller in operational communication with the first deployment mechanism and the main valve and comprising:
a HCV check valve in operational communication with the at least one lift bag and the at least one ride bag;
a first pressure switch comprising a predetermined pressure level in operational communication with the HCV check valve;
a first solenoid valve in communication with the first pressure switch;
a second pressure switch comprising a predetermined pressure level in operational communication with the HCV check valve;
a second solenoid valve in communication with the second pressure switch;
a third pressure switch comprising a predetermined pressure level and in operational communication with the lift bag;
an annunciator in operational communication with the third pressure switch;
a power source in communication with the controller; and
a fail-safe solenoid valve adapted to lower the first lift axle when no power is received at the controller.

2. The lift axle control system of claim 1, wherein the annunciator is a light located in a cab of the wheeled vehicle and is powered on when the lift axle is the raised position.

3. The lift axle control system of claim 2, wherein the annunciator is powered off when the lift axle is in the lowered position.

4. The lift axle control system of claim 1, wherein the wheeled vehicle further comprises a second lift axle, and further comprising:
A second deployment mechanism in operational communication with the controller and the second lift axle and comprising:
at least one lift bag in operational communication with the second lift axle;
at least one ride bag in operational communication with the second lift axle;
a lift bag valve in operational communication with the at least one lift bag;
a ride bag valve in operational communication with the at least one ride bag; and
an air source in operational communication with the at least one lift bag, the lift bag valve, the at least one ride bag, and the at least one ride bag valve, and wherein the fail-safe valve of the controller is adapted to lower the second lift axle when no power is received at the controller.

5. A lift controller for a wheeled vehicle having a lift axle system comprising a first lift axle, at least one lift bag and at least one ride bag, comprising:

a HCV check valve in operational communication with the at least one lift bag and the at least one ride bag;

a first pressure switch comprising a predetermined pressure level in operational communication with the HCV check valve;

a first solenoid valve in communication with the first pressure switch;

a second pressure switch comprising a predetermined pressure level in operational communication with the HCV check valve;

a second solenoid valve in communication with the second pressure switch;

a third pressure switch comprising a predetermined pressure level and in operational communication with the lift bag;

an annunciator in operational communication with the third pressure switch;

a power source in communication with the controller; and a fail-safe solenoid valve adapted to lower the first lift axle when no power is received at the controller.

6. The controller of claim 5, wherein the wheeled vehicle has a second lift axle system comprising a lift axle and at least one ride bag and at least one lift bag, the controller comprising a fail-safe solenoid valve adapted to lower the second lift axle when no power is received at the controller.

7. A method for controlling with a controller the lowering of a first lift axle of a wheeled vehicle when power is interrupted to the controller, comprising:

providing a first deployment mechanism in communication with the first lift axle and further adapted to raise or lower the first lift axle;

providing a controller in operational communication with the deployment mechanism, the controller comprising a fail-safe solenoid valve;

providing a power source in connection with the controller and with the fail-safe solenoid valve;

enabling the fail-safe solenoid valve to lower the first lift axle when no power is received by the controller and the fail-safe solenoid valve and providing an annunciator that is powered on when the first lift axle is in a raised position.

8. The method of claim 7, wherein wheeled vehicle has a second lift axle, further comprising:

providing a second deployment mechanism in operational communication with the controller and the second lift axle and further adapted to raise or lower the second lift axle;

enabling the fail-safe solenoid valve to lower the second lift axle when no power is received by the controller and the fail-safe solenoid valve.

9. The method of claim 7, further comprising providing an annunciator that is not powered on when the first lift axle is in a lowered position.

10. The method of claim 8, further comprising providing an annunciator that is powered on when the second lift axle is in a raised position.

11. The method of claim 8, further comprising providing an annunciator that is not powered on when the second lift axle is in a lowered position.

* * * * *